UNITED STATES PATENT OFFICE.

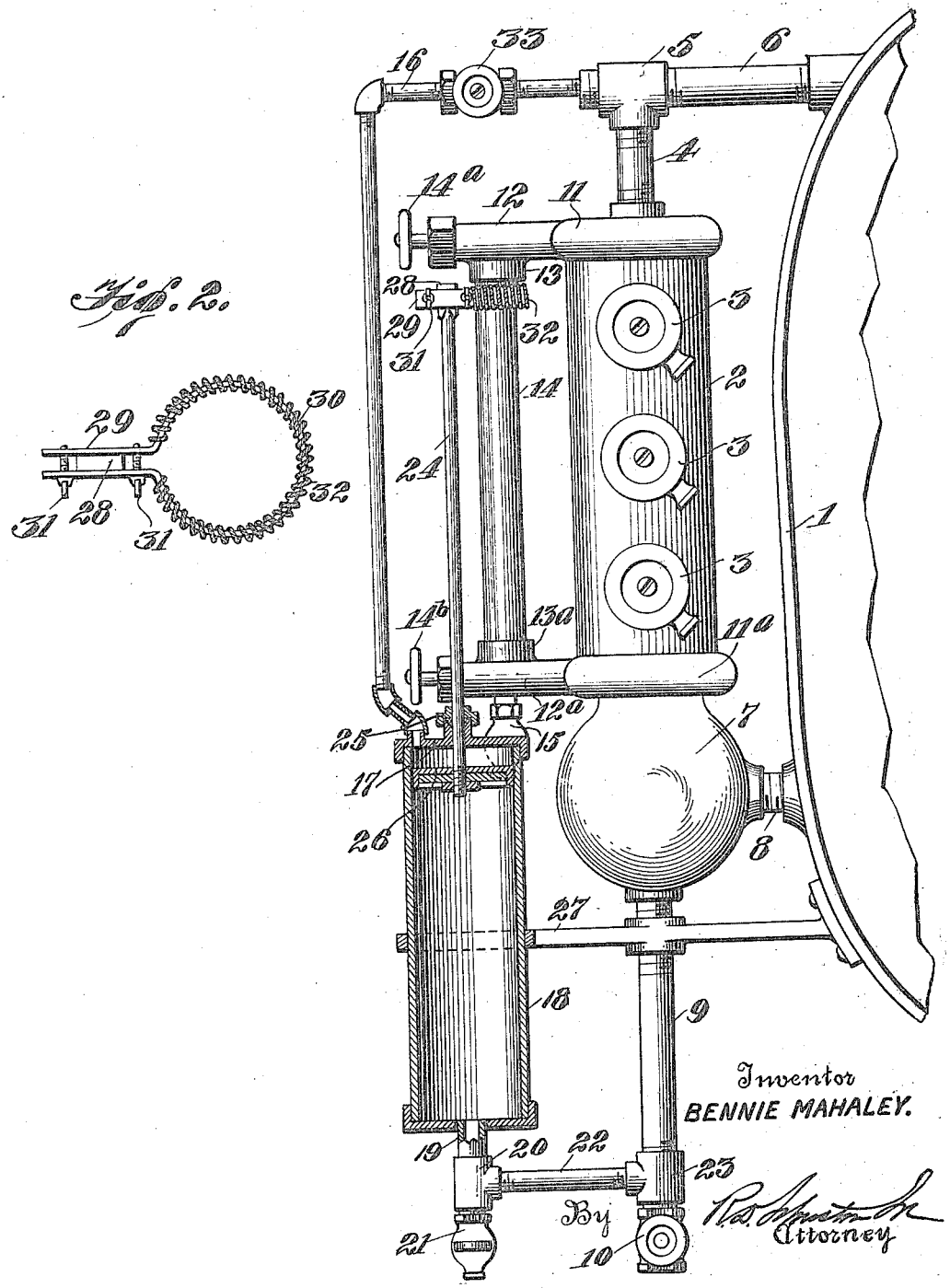

BENNIE MAHALEY, OF BIRMINGHAM, ALABAMA.

AUTOMATIC GAGE-GLASS WIPER.

1,234,191. Specification of Letters Patent. Patented July 24, 1917.

Application filed February 14, 1917. Serial No. 148,622.

*To all whom it may concern:*

Be it known that I, BENNIE MAHALEY, a citizen of the United States of America, residing at Birmingham, in the county of Jefferson and State of Alabama, have invented certain new and useful Improvements in Automatic Gage-Glass Wipers, of which the following is a specification.

My invention relates to an automatic appliance for wiping and cleaning the gage glasses of boilers so that the glass can at all times be read easily and accurately. Gage glasses, according to present practice, are cleaned by hand and the work is often neglected so that faulty or incorrect reading of the glass frequently occurs with serious results.

According to my invention I provide, as my preferred wiper operating mechanism, a cylinder and plunger so connected up that each time the blow-off valve of the gage glass column is operated, the plunger will be reciprocated and returned to initial position and I connect the plunger to a wiper surrounding the gage glass which is moved back and forth the length of the glass with each reciprocation of the plunger. The cleaning of the glass is thus automatically accomplished and by an appliance which can be readily connected to the present gage glass installations.

My invention further comprises the novel features of construction and arrangements of parts which are shown in the preferred embodiment only in the accompanying drawings and in which:—

Figure 1 shows a gage glass, the column supporting it and their piping connections in elevation and the automatic plunger and its cylinder in section.

Fig. 2 is an enlarged plan of the wiper.

Similar reference numerals refer to similar parts throughout the drawings.

I have shown my invention as applied to a standard type of gage glass equipment for a boiler 1, the same comprising a column 2 having a plurality of pet cocks 3 thereon and connected at its top through a pipe 4 and fitting 5 to the pipe 6 that enters the boiler above the water line. At its lower end the column is connected to a globular fitting 7 which has a lateral pipe connection 8 entering the boiler below the water line and has a column pipe 9 leading from its bottom and having a blow-off valve 10 therein. The column at its upper end is provided with a head 11 having a lateral valve casing 12 and a downturned seat 13 to receive the upper end of the gage glass 14. The column has a bottom head $11^a$ similar to 11 and equipped with a valve casing $12^a$ and seat $13^a$ to receive the lower end of the gage glass. Valves $14^a$ and $14^b$, respectively, serve to connect or disconnect the opposite ends of the gage glass with the column. The bottom valve casing carries a drain cock 15.

The equipment as thus described is standard and may have substituted therefor any other standard form of gage glass equipment, that shown being merely illustrative.

A pipe 16 connects to the boiler above water line, preferably by being tapped into the T-fitting 5. Its lower end is connected into the upper head 17 of a cylinder 18 which at its lower end is connected by a pipe 19 to a T-fitting 20 having a drain cock 21 connected to its bottom branch and having its side branch connected by a pipe 22 and fitting 23 to the column pipe 9. A plunger rod 24 passes through a stuffing box 25 in the top 17 of the cylinder and is connected at its lower end to a plunger 26. The cylinder is suitably connected by a bracket 27 to the boiler or column pipe, as may be desired.

The upper end of the plunger rod is flattened at 28 to form a shoulder which is received between the clamp arms 29 of the wiper frame 30. These arms 29 carry set screws 31 which draw them together on each side of the end 28 of the plunger and detachably clamp the wiper frame to the plunger. The wiper frame is preferably made of a steel band having its ends brought into parallelism and having its intermediate portion bent to a circle slightly greater in diameter than the external diameter of the gage glass. The circular portion of the wiper is wound with any suitable fabric, cloth, waste or like wiping substance 32 which, when the wiper frame is detached, can be readily removed and replaced. A valve 33 is provided in the pipe 16.

In operation, the valve 33 is left open, and the valve 10 is closed. Under these conditions the plunger 26 will be unbalanced to the extent of the head of water from the boiler acting to force it upwardly and maintain it at the upper end of the cylinder, which is its normal position with the wiper at the top of the gage glass. When the attendant blows off the column, as is done several times daily, the valve 10 is opened, thus effecting a release of pressure under the plunger and causing it to be unbalanced temporarily by the steam pressure overhead and forced thereby downwardly to carry the wiper to the bottom of the gage glass. As soon as the blow-off operation is completed and the valve 10 closed, the steam pressures on the plunger will balance but the water pressure will return the plunger to initial position and move the wiper back up the gage glass to full line position, Fig. 1, thus giving the glass a double wiping with each blow off of the column pipe. The wiping operation being automatic will maintain the gage glass clean and readily readable.

What I claim as new and desire to secure by Letters Patent, is:—

1. The combination with a gage glass, connections therefor to a boiler, and a blow-off mechanism for the boiler, of wiper mechanism for the gage glass and means to operate it automatically responsive to the operation of said blow-off mechanism.

2. The combination with a gage glass, its connections to the boiler, and blow-off means for the boiler, of a reciprocable wiper for the gage glass, and automatic mechanism for reciprocating the wiper responsive to the operation of the blow-off means.

3. The combination with a gage glass, its connections to a boiler, and a blow-off valve for the boiler, of a reciprocable wiper for the gage glass, a plunger connected to the wiper, and a cylinder for the plunger having its upper end connected to the boiler and having its lower end also connected through said connections to the boiler below its water line.

4. An automatic gage glass cleaner comprising, in combination with a boiler, a gage glass, connections therefrom to the boiler, and a blow-off valve in said connections, of a cylinder connected at one end to the boiler above the water line and at its other end connected through the gage glass connections to the boiler below its water line, a plunger reciprocable in the cylinder and sensitive to both the steam and water pressure of the boiler, a plunger rod reciprocable parallel with the gage glass, and a wiper for the gage glass carried by said plunger rod.

5. The combination with a boiler having a gage glass, boiler connections for the gage glass, a blow-off valve for the boiler, a cylinder coupled at its lower end to the gage glass connections above the blow-off valve and also connected at its upper end to the boiler above the water level therein, a plunger automatically reciprocable in the cylinder responsive to the operation of the blow-off valve, a plunger rod reciprocable with the plunger parallel with the gage glass, and a gage glass wiper clamped to the plunger and adapted to be opened to disengage it from the glass.

6. An automatic gage glass wiper mechanism comprising a blow-off mechanism for the boiler, a reciprocable element, means to move said element in response to the operation of said blow-off mechanism, an annular spring band surrounding the gage glass and clamped at its ends to said element, and wiping material surrounding the spring band, substantially as described.

In testimony whereof I affix my signature.

BENNIE MAHALEY.

Witness:
NOMIE WELSH.

Copies of this patent may be obtained for five cents each, by addressing the "Commissioner of Patents, Washington, D. C."